United States Patent [19]

Rodgers

[11] Patent Number: 4,658,418

[45] Date of Patent: Apr. 14, 1987

[54] MULTIPLE TELEPHONE JACK SLIDE ASSEMBLY

[75] Inventor: E. Walter Rodgers, Glendale, Ariz.

[73] Assignee: Armor Metals, Inc., Phoenix, Ariz.

[21] Appl. No.: 839,740

[22] Filed: Mar. 14, 1986

[51] Int. Cl.$^4$ ............................................. H05K 5/00
[52] U.S. Cl. ..................................... 379/328; 379/325
[58] Field of Search ......................................... 179/98

[56] References Cited

U.S. PATENT DOCUMENTS

| | | | |
|---|---|---|---|
| 4,371,757 | 2/1983 | Debortoli et al. | 179/98 |
| 4,605,275 | 8/1986 | Pavel | 179/98 |

Primary Examiner—Gene Z. Rubinson
Assistant Examiner—David R. Schuster
Attorney, Agent, or Firm—Cahill, Sutton & Thomas

[57] ABSTRACT

A multiple telephone jack slide assembly includes a jack support member for supporting a multitude of telephone jacks upon a telephone interchange wiring panel. The jack support member has a longitudinal channel formed by a slotted opening for slidingly receiving grooved telephone jacks, the grooves engaging edge portions of the slotted opening. The jack support member is fastened either directly to the wiring panel by fasteners or is secured within a conventional terminal board mounting bracket. One or more retaining members are secured to the jack support to inhibit further sliding movement of the telephone jacks after the same are inserted in the channel through an open end thereof. The support member may also support a conventional punch down terminal board adjacent the plurality of telephone jacks.

16 Claims, 14 Drawing Figures

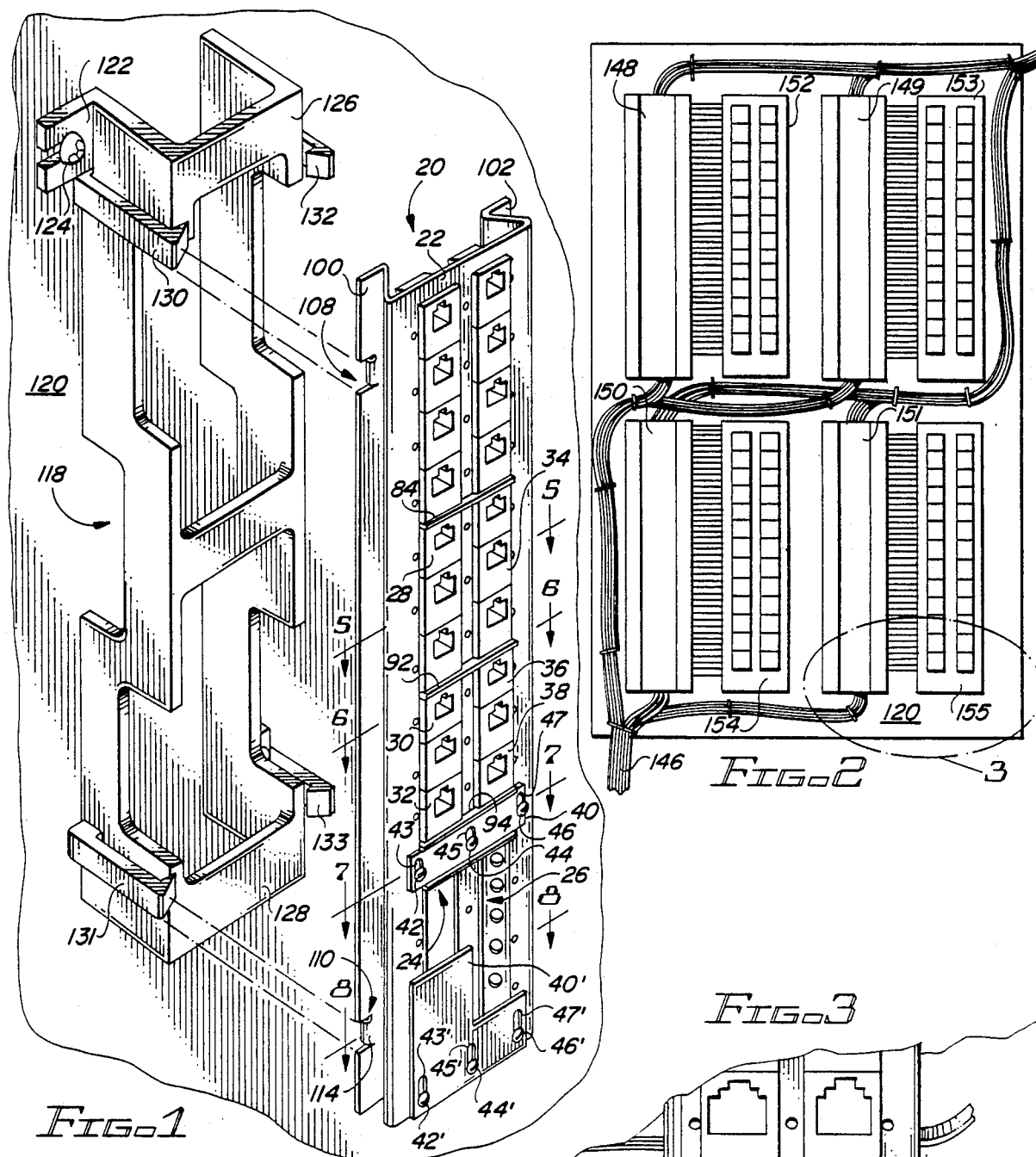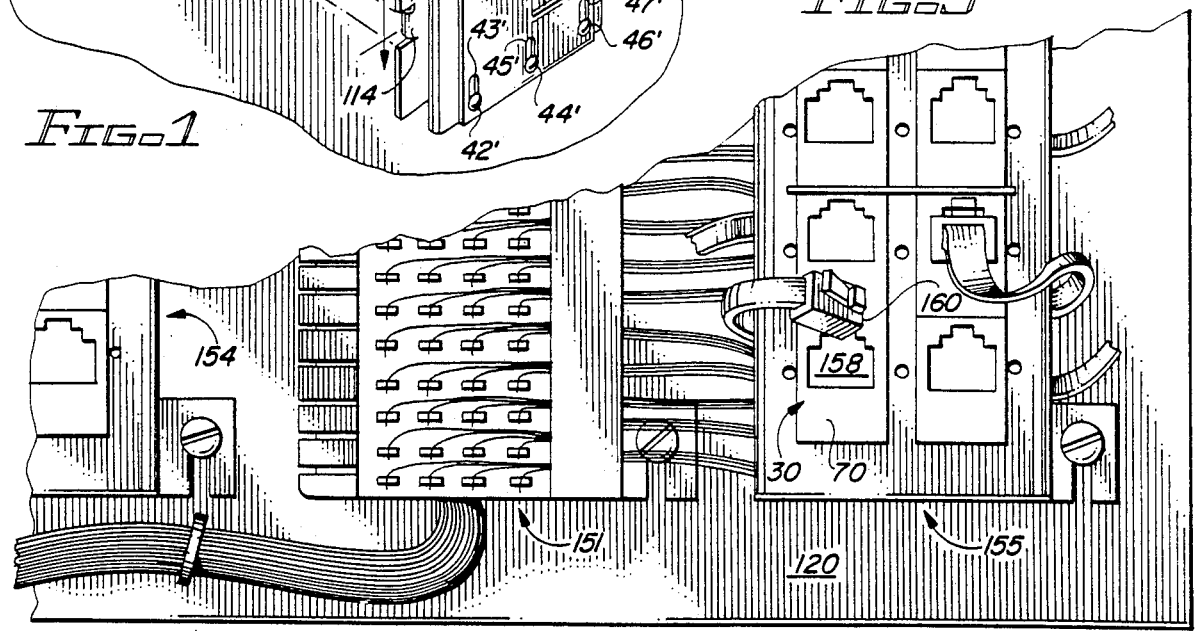

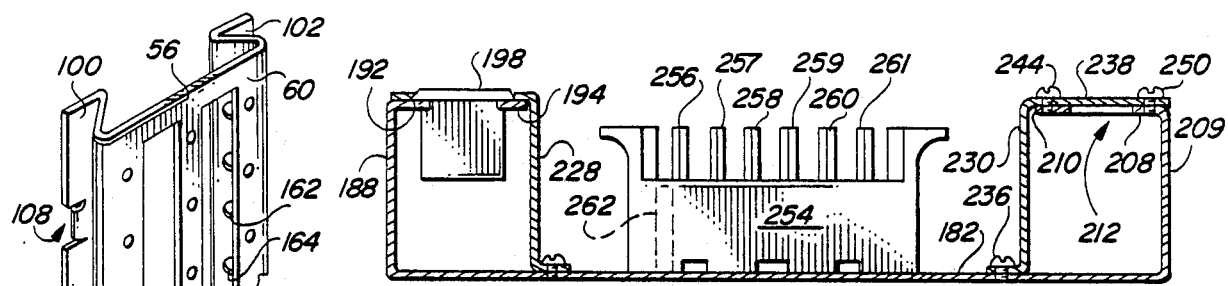
FIG-12
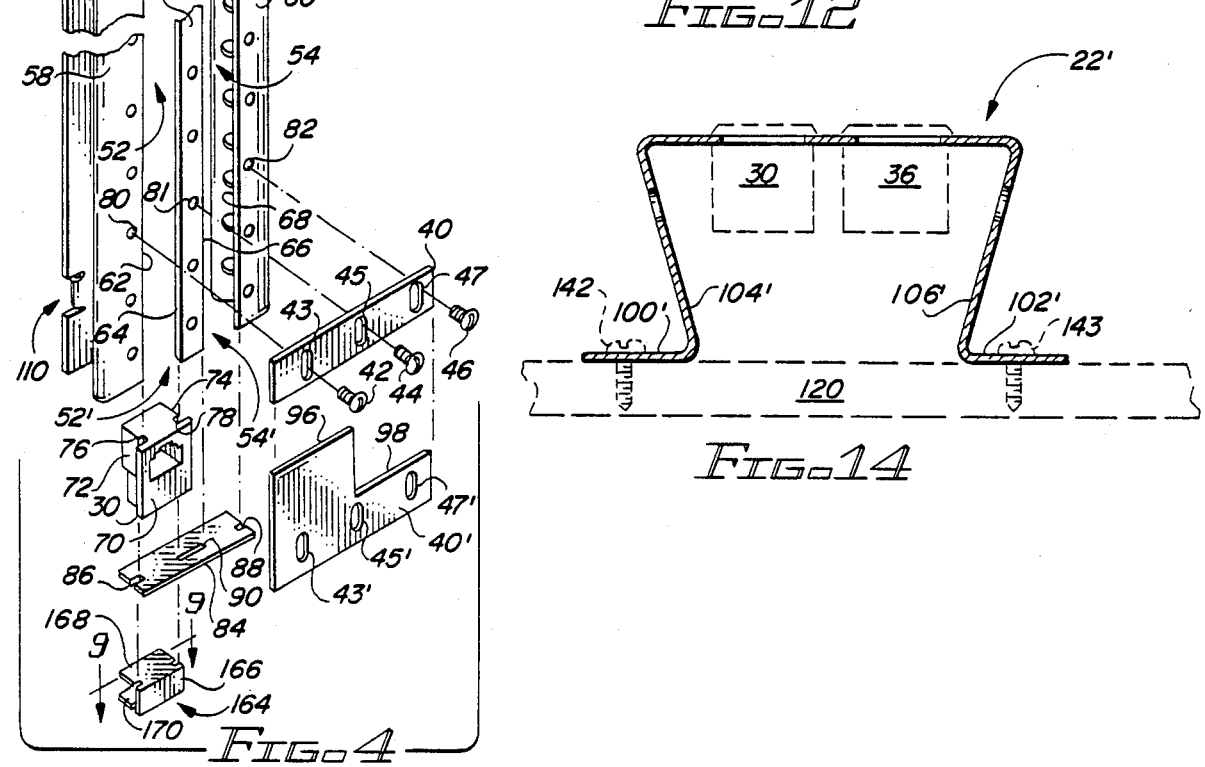
FIG-4
FIG-14
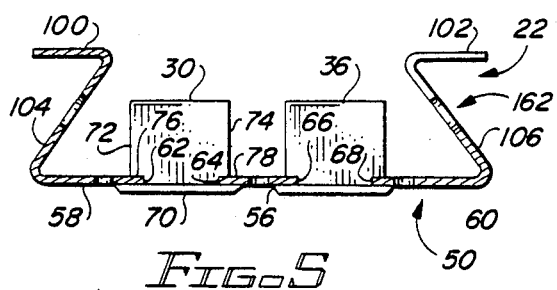
FIG-5
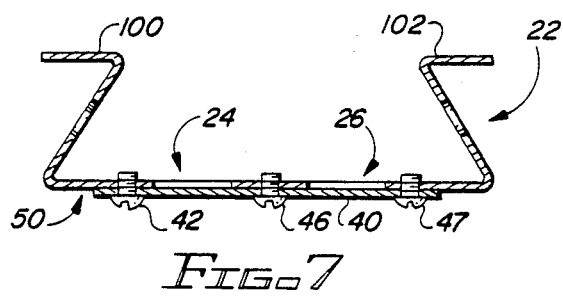
FIG-7
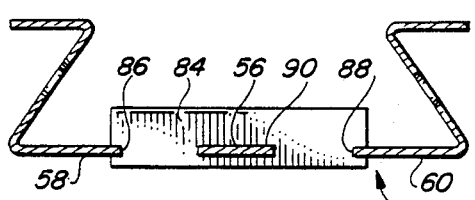
FIG-6
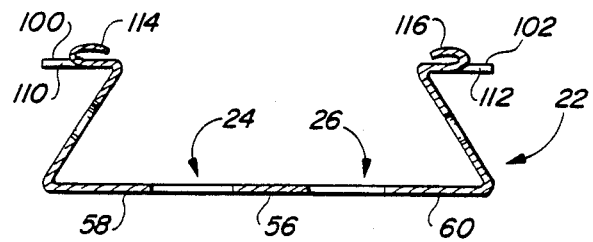
FIG-8
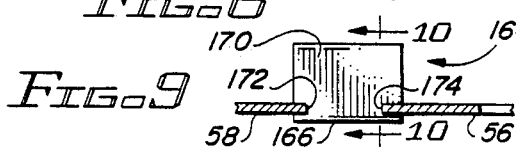
FIG-9
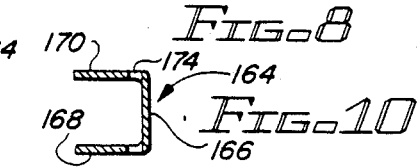
FIG-10

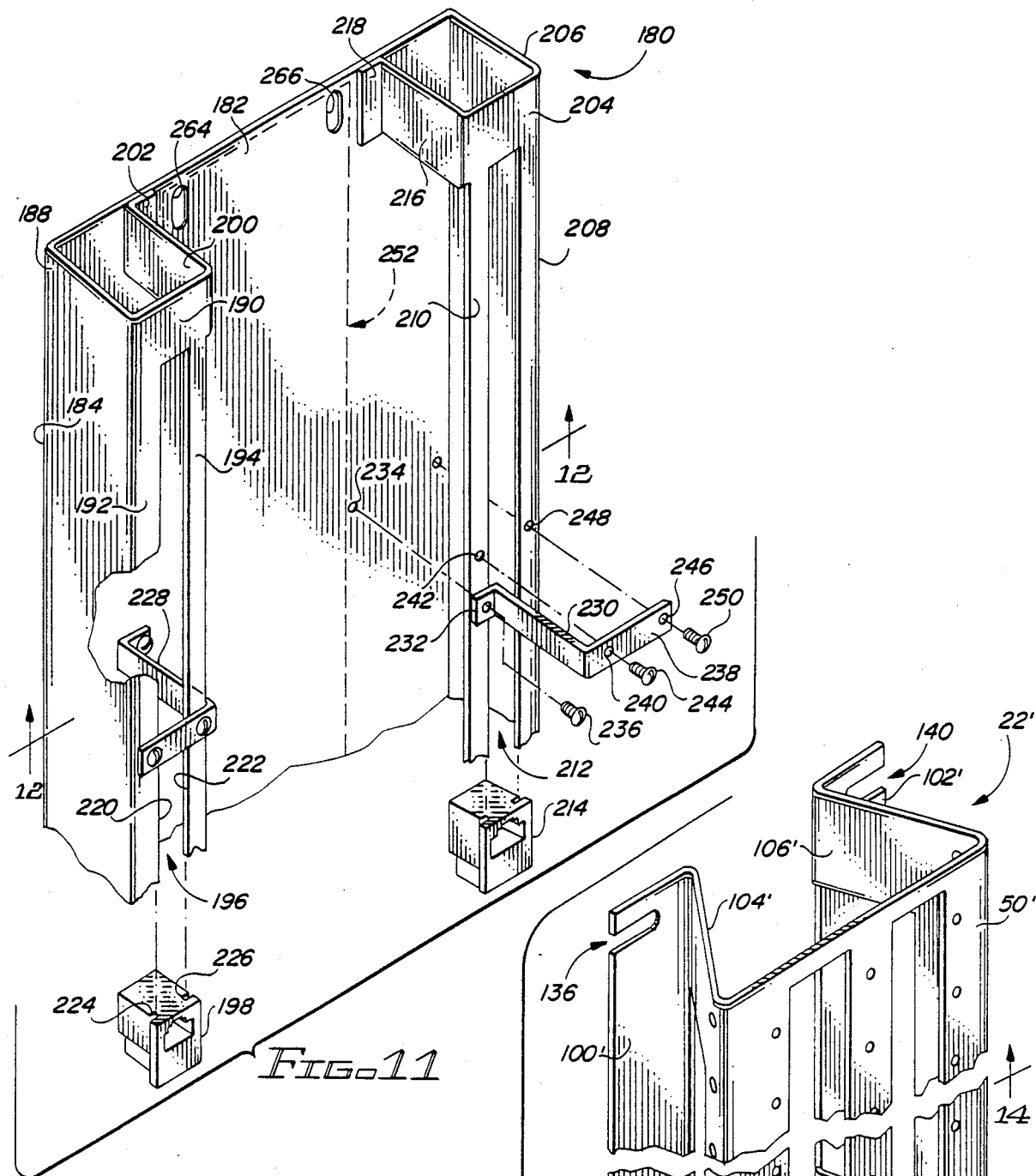
FIG_11
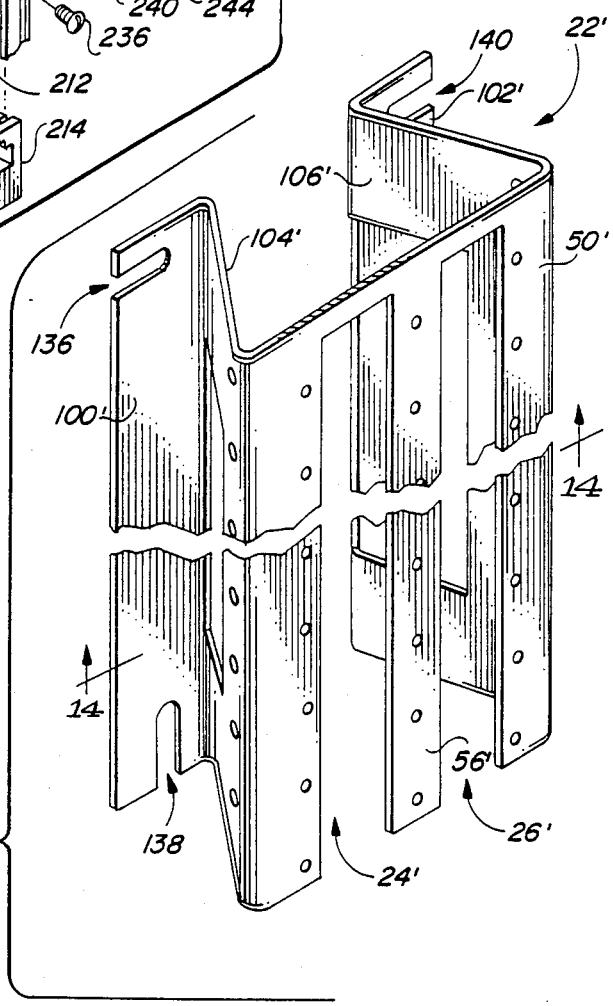
FIG_13

MULTIPLE TELEPHONE JACK SLIDE ASSEMBLY

BACKGROUND OF THE INVENTION

1. Field of the Invention

The present invention relates generally to telephone wiring interchange equipment, and more particularly, to apparatus adapted to slidingly receive and support a plurality of telephone jacks upon a telephone wiring interchange panel.

2. Description of the Prior Art

Within businesses, offices, apartment complexes and other locations where a number of telephone lines are clustered together, telephone service is typically provided via a central telephone interchange wiring panel installed at the site of the business, office, apartment complex, etc. Often, an underground trunk cable is routed to the wiring panel, and the interconnection between the trunk cable and the individual telephone lines is made upon the wiring panel. Individual telephone line wires are routed from the wiring panel to each telephone in use at the site.

Presently, wiring interconnections are typically made upon the telephone interchange wiring panel through the use of so-called punch down blocks, also known as terminal boards. These devices, supplied by American Telephone & Telegraph Company and others, provide multiple rows of wire gripping terminals housed in a plastic base unit, the wire gripping terminals being adapted to releasably grasp and retain the stripped ends of telephone wires. Depending upon the specific model of the terminal board in use, all of the terminals within any given row may be shorted together by a common bus bar. Such terminal boards are either fastened directly to a back panel or are releasably supported by plastic mounting brackets secured to such a back panel.

Usually, four separate color-coded wires are routed to the terminal board from the main trunk line for each telephone line to be served at the site. The four separate wires are typically connected to four successive rows of terminals upon the terminal board. Another set of four color-coded wires is connected to the aforementioned four successive rows of terminals, and this second set of four wires is routed to a telephone at the site Whenever new service is to be established for a new telephone line, old service is to be disconnected for an existing telephone line, or a user assigned to a particular telephone line wants to relocate the telephone line to a different office or location at the site, a telephone service man must go to the wiring panel, locate the four rows of terminals assigned to the pertinent telephone line, and either connect, disconnect or move the four wires upon the terminal board corresponding to the effected telephone line.

In order to minimize the time required by the serviceman to make such wiring changes at the wiring panel, it has been proposed to provide a telephone jack and mating telephone plug for each telephone line serviced by the wiring panel. The advantage in implementing such a system is that telephone service can then be established or disconnected simply by inserting or removing the telephone plug from the related telephone jack. Similarly, service for a particular telephone line can be shifted to a different office or apartment simply by shifting a plug on the wiring panel from one telephone jack to another.

However, prior to the development of the present invention, there has been no convenient apparatus for supporting a large number of telephone jacks upon a telephone interchange wiring panel in a compact and inexpensive manner. Many thousands of such telephone interchange wiring panels already exist in the field, and any such apparatus for supporting a multitude of telephone jacks must necessarily be compatible and retrofit to existing wiring panels. Because such wiring panels are employed in great numbers, any such apparatus for supporting a multitude of telephone jacks should be inexpensive to manufacture and assemble in order to be practical from a commercial standpoint. In addition, because terminal boards vary in the number of telephone lines which can be handled by each such board, and because the number of telephone lines to be served varies from site to site, any such apparatus for supporting a multitude of telephone jacks upon a wiring panel should ideally be readily reconfigurable to provide a variety of differently numbered and variously spaced telephone jacks.

Accordingly, it is an object of the present invention to provide an apparatus for supporting a multitude of telephone jacks upon a telephone interchange wiring panel which apparatus is compact and adapted to be mounted to and used in conjunction with existing wiring panels.

It is another object of the present invention to provide such an apparatus which is relatively inexpensive to manufacture and assemble.

It is yet another object of the present invention to provide such an apparatus which does not require any modification of conventional telephone jacks already commercially available.

It is a further object of the present invention to provide such an apparatus in which it is a simple matter to vary the number of telephone jacks and the spacing therebetween when supported by such an apparatus.

These and other objects of the present invention will become more apparent to those skilled in the art as the description thereof proceeds.

SUMMARY OF THE INVENTION

Briefly described, and in accordance with one embodiment thereof, the present invention provides a multiple telephone jack slide assembly for supporting a multitude of telephone jacks upon a telephone interchange wiring panel, the assembly including a support member having an open ended channel formed therein, the channel being bounded by first and second opposing edge portions of the support member. The first and second edge portions are generally directed toward one another and separated by a predetermined distance corresponding to the width of the channel. Fastening means are provided for fastening the support member to a conventional telephone interchange wiring panel. The assembly further includes a plurality of telephone jacks of the type designed to releasably receive a mating telephone cord plug. Such telephone jacks have a width approximating the width of the channel in the support member. The side walls of the telephone jacks slidingly engage the opposing edge portions of the channel formed in the support member for permitting each of the telephone jacks to be slid into the channel through the opened end thereof. After the appropriate number of telephone jacks are inserted within the channel, a retaining member is releasably fastened to the support member and abuts at least one of the telephone jacks for preventing any further sliding movement of the telephone jacks slidingly received within the channel.

In the preferred embodiment of the present invention, the support member includes a generally planar elongated surface having a slotted opening formed therein in order to provide a longitudinal channel. Each of the telephone jacks has grooves formed in the side walls thereof which grooves are of a width commensurate with the thickness of the generally planar elongated surface of the support member. The width of the telephone jacks slightly exceeds the width of the channel formed in the support member. The grooves formed in the side walls of the telephone jack are designed to slidingly receive the opposing edge portions of the support member bounding the slotted opening for allowing each of the telephone jacks to be slid into the channel and supported by the support member.

In the preferred embodiment of the present invention, the generally planar surface in which the slotted opening is formed is raised above the lower surface of the support member by at least one upwardly extending side wall in order to provide sufficient clearance for the lower portion of the telephone jack and the passage of wires emanating therefrom. In one form of the invention, the support member includes lower flanges generally parallel to the generally planar elongated surface in which the channel is formed, which lower flanges are adapted to be fastened to the wiring panel. The lower flanges may have apertures formed therein for being directly connected to the wiring panel; alternately, the lower flanges may include rectangular recesses and ears for being releasably engaged by the latch fingers of a terminal board mounting bracket.

In one preferred form of the present invention, a pair of telephone jack receiving channels are formed within the generally planar elongated surface of the support member, the two channels being divided from one another by a finger portion. Stiffening members are preferably used to engage the finger portion as well as the edge portions of the channels opposite the finger portion in order to stiffen the finger portion against deflection. A single retaining member extending across both of the channels and abutting at least one of the telephone jacks inserted within each of the channels also serves to stiffen the finger portion.

In another preferred form of the invention, a pair of telephone jack receiving channels are formed above and along opposing sides of a generally rectangular base. The base is adapted to be fastened directly to a telephone interchange wiring panel. A punch down terminal board is supported upon the base between the two channels to facilitate wiring interconnections between the telephone jacks and the terminal board. Preferably, the same fasteners used to secure the base of the support member to the wiring panel are also used to secure the terminal board to the base. Side walls extending upwardly from opposing side edges of the base are each coupled to one side edge of a generally planar elongated surface in which one of said channels is formed. Opposing side edges of the generally planar elongated surfaces are supported by legs extending upwardly from the base, which legs may further serve to inhibit further sliding movement of the telephone jacks slid into the first and second channels.

BRIEF DESCRIPTION OF THE DRAWINGS

FIG. 1 is a perspective view of a multiple telephone jack slide assembly constructed in accordance with one embodiment of the present invention and adapted to be supported by a terminal board mounting bracket also illustrated within FIG. 1.

FIG. 2 is a top view of a telephone interchange wiring panel including both conventional punch down terminal boards and the novel multiple telephone jack slide assembly corresponding to the present invention.

FIG. 3 is an enlarged view of the portion of FIG. 2 encircled by dashed oval 3.

FIG. 4 is an exploded perspective view of the multiple telephone jack slide assembly shown in FIG. 1.

FIGS. 5, 6, 7 and 8 are cross-sectional views of the multiple telephone jack slide assembly taken through the lines designated 5—5, 6—6, 7—7, and 8—8, respectively, as shown in FIG. 1.

FIGS. 9 and 10 are cross-sectional views of a spacer member shown in FIG. 4 taken through lines 9—9 and 10—10, respectively.

FIG. 11 is a partial perspective view of an alternate embodiment of the present invention wherein two telephone jack receiving channels are disposed along opposing sides of a base adapted to support a punch down terminal board between such channels.

FIG. 12 is a cross-sectional view of the multiple telephone jack slide assembly shown in FIG. 11 taken through lines 12—12 and further illustrating the punch down terminal board positioned upon the base.

FIG. 13 is a partial perspective view of an alternate embodiment of the multiple telephone jack slide assembly shown in FIG. 1.

FIG. 14 is a cross-sectional view of the assembly shown in FIG. 13 as taken through lines 14—14.

DETAILED DESCRIPTION OF THE PREFERRED EMBODIMENTS

With reference to FIG. 1, a multiple telephone jack slide assembly is designated generally by reference numeral 20 and includes a sliding jack support member 22. Formed within support member 22 are first and second longitudinal channels 24 and 26 adapted to slidingly receive a first plurality of telephone jacks including those designated by reference numerals 28, 30 and 32, and a second plurality of telephone jacks including those designated by reference numerals 34, 36 and 38, respectively. Also shown in FIG. 1 is a retaining member 40 which extends across and generally perpendicular to channels 24 and 26. Screws 42, 44 and 46 extend through slotted apertures 43, 45 and 47, respectively, formed within retaining member 40 for securing retaining member 40 in a selected position along support member 22. As shown in FIG. 1, support member 40 generally abuts the lower edges of telephone jacks 32 and 38 for inhibiting further sliding movement of the inserted telephone jacks within channels 24 and 26. An alternate form of retaining member is shown within FIG. 1 and is designated by reference numeral 40'. Features of retaining member 40' which correspond to those described with regard to retaining member 40 have been identified with correspondingly primed reference numerals.

For purposes of clarifying the construction and assembly of the multiple telephone jack slide assembly shown in FIG. 1, an exploded view thereof is shown in FIG. 4. As shown, support member 22 includes a raised generally planar elongated surface 50 in which a first slotted opening 52 is formed having an open end 52'. A second slotted opening 54 having an open end 54' is also formed within generally planar elongated surface 50 parallel and adjacent to slotted opening 52. A resulting finger portion 56 of generally planar elongated surface 50 serves to divide slotted openings 52 and 54 from one another. Slotted openings 52 and 54 provide the first and second elongated channels 24 and 26, respectively, described with respect to FIG. 1 above. The width of slotted openings 52 and 54 are equal to one another, as they serve substantially the same purpose. Slotted opening 52 is bounded by finger portion 56 and a first side portion 58 of elongated surface 50, while slotted opening 54 is bounded by finger portion 56 and a second opposing side portion 60 of elongated surface 50.

Referring to FIGS. 4 and 5, slotted opening 52 is defined by opposing edge portions 62 and 64 of jack support 22. Similarly, slotted opening 54 is bordered by opposing edge portions 66 and 68 of support member 22. As shown in FIG. 4, telephone jack 30 is adapted to be slid between opposing edge portions 62 and 64 of jack support 22 for being supported by longitudinal channel 24 corresponding to slotted opening 52. As shown in FIGS. 4 and 5, telephone jack 30 includes an upper surface 70 and a pair of opposing side walls 72 and 74 which extend downwardly therefrom, substantially perpendicular thereto. Opposing side walls 72 and 74 are separated from one another by a distance approximating the width of slotted opening 52. In the preferred embodiment of the present invention, side walls 72 and 74 of telephone jack 30 are separated by a distance slightly in excess of the width of slotted opening 52. A groove 76 is provided within the side wall 72 of telephone jack 30 just below upper surface 70. A similar groove 78 is provided within side wall 74 of telephone jack 30. The thickness of elongated surface 50 of support member 22 is selected to be commensurate with the width of grooves 76 and 78 formed within telephone jack 30. Accordingly, grooves 76 and 78 slidingly engage opposing edge portions 62 and 64 of longitudinal channel 24 for permitting telephone jack 30 to be slid into the channel from open end 52'. As shown in FIG. 1, a multitude of such telephone jacks can be slid into longitudinal channel 24 prior to locking such telephone jacks in place against further sliding movement by retaining member 40.

Referring to FIG. 4, a series of regularly spaced threaded holes, such as those designated by reference numerals 80, 81 and 82 are formed along elongated surface 50 on finger portion 56 and opposing side portion 58 and 60. Threaded holes 80, 81 and 82 are engaged by screws 42, 44 and 46, respectively, in order to secure retaining member 40 across longitudinal channesl 24 and 26. Slotted apertures 43, 45 47 permit retaining member 40 to be laterally shifted prior to tightening screws 42-46 in order to permit retaining member 40 to abut the endmost telephone jacks and thereby inhibit further sliding movement of the telephone jacks supported by support member 22. Moreover, retaining member 40 further serves to stiffen finger portion 56 against deflection out of the plane in which elongated surface 50 lies.

In order to further stiffen finger portion 56 against deflection, stiffening members, such as that designated by reference numeral 84 within FIG. 4, can be periodically slid onto jack support 22 between groupings of telephone jacks. Stiffening member 84 has a length slightly in excess of the distance between edge portion 62 and edge portion 68 of elongated surface 50. Grooves 86 and 88 are formed within opposing side walls of stiffening member 84 for slidingly engaging edge portions 62 and 68. In addition, a further groove in the form of a rectangularly shaped aperture 90 is formed within the central portion of stiffening member 84 for permitting finger portion 56 to be advanced therethrough. Referring briefly to FIG. 1, such stiffening members are designated by reference numerals 84, 92 and 94.

As mentioned above, retaining member 40' shown in FIGS. 1 and 4 designates an alternate form of retaining member which is particularly useful when longitudinal channel 24 has one less telephone jack within it than longitudinal channel 26. Retaining member 40' includes a first abutment 96 and a second abutment 98 offset therefrom by a distance corresponding to the length of one telephone jack. In this manner, abutment edges 96 and 98 may simultaneously abut the endmost telephone jacks within longitudinal channels 24 and 26 and inhibit sliding movement of the telephone jacks installed within each of such channels.

With reference to FIGS. 1 and 5, jack support member 22 includes a pair of lower supporting flanges 100 and 102 which extend generally parallel to and commensurate with elongated surface 50. A pair of sloped slide members 104 and 106 extend upwardly from lower support flanges 100 and 102 respectively, and are coupled to side portions 58 and 60, respectively, for raising elongated surface 50 above the plane in which lower support flanges 100 and 102 lie. Elongated surface 50 is spaced apart from lower support flanges 100 and 102 by at least the depth of the telephone jacks in order to avoid interference with the sliding movement of the telephone jacks within their supporting channels.

Lower flanges 100 and 102 of support member 22 may be fastened to a telephone interchange wiring panel by different methods. In one embodiment of the present invention, rectangular cutouts or notches 108 and 110 are formed adjacent the opposing ends of lower support flange 100. Corresponding rectangular cutouts are formed on lower support flange 102, including rectangular cutout 112 shown in FIG. 8. Such rectangular cutouts are preferably formed by doubling over the material removed from the cutout portion to form bent ears, such as those shown in FIG. 8 as designated by reference numerals 114 and 116. Referring to FIG. 1, a plastic mounting bracket 118 is shown of the type commonly used to secure punch down terminal boards to back panel 120. An example of such a plastic mounting bracket is that commercially available from American Telephone & Telegraph Company (formerly Western Electric) under the model designation 89B. Mounting bracket 118 includes lower support flanges, such as that identified by reference numeral 122 adapted to be fastened against wiring panel 120, as by a screw 124. Plastic mounting bracket 118 includes raised support surfaces 126 and 128, and further includes a set of four spring-biased latch fingers 130, 131, 132 and 133. The uppermost, inwardly projecting ends of latch fingers 130–133 extend just above support surfaces 126 and 128 and are designed to grasp the base portion of a punch down terminal board for retaining the same against support surfaces 126 and 128. Accordingly, the spacing between rectangular cutouts 108 and 110 formed in lower support flange 100 of support member 22 is made to correspond to the distance between latch fingers 130 and 131. Similarly, the distance between ears 114 and 116 (see FIG. 8) is made to correspond to the distance between latch fingers 131 and 133, thereby allowing latch fingers 131 and 133 to releasably grasp ears 114 and 116, maintaining the doubled over lower portions thereof against support surface 128. By doubling over ears 114 and 116, a generally rounded surface is provided for more easily spreading latch fingers 131 and 133 when support member 22 is fastened to mounting bracket 118.

Referring briefly to FIGS. 13 and 14, an alternate embodiment of the present invention is illustrated wherein the lower support flanges 100' and 102' are adapted to be directly fastened to wiring panel 120. Within FIGS. 13 and 14, those features of the jack support member which generally correspond to those previously described with reference to FIGS. 1, 4 and 5 have been designated by correspondingly primed reference numerals. As shown in FIG. 13, slotted apertures 136 and 138 are formed at opposing ends of lower support flange 100'; similar slotted apertures, including aperture 140 are formed at opposing ends of lower support flange 102'. The distance measured diagonally from slotted aperture 138 to slotted aperture 140 is made to correspond to the distance between corresponding apertures formed within the support flanges 122 of plastic mounting bracket 118 (see FIG. 1). In this manner, screws, such as those designated in FIG. 14 by reference numerals 142 and 143 may be used to directly fasten the lower support flanges 100' and 102' of support member 22' to wiring panel 120. Side walls 104' and 106' for the embodiment shown in FIGS. 13 and 14 are substantially taller than corresponding side walls 104 and 106 for the embodiment shown in FIGS. 4 and 5 in order to space telephone jacks 30 and 36 a sufficient distance above wiring panel 120 to permit the routing of telephone wires between wiring panel 120 and telephone jacks 30 and 36.

FIGS. 2 and 3 best illustrate the manner in which multiple telephone jack slide assemblies of the type described with respect to FIGS. 1–8 and 13–14 are used in conjunction with a conventional telephone interchange wiring panel. Within FIG. 2, the bundled cable 146 represents a bundle of telephone wires originating from an underground trunk line operated by the telephone company. Four punch down terminal boards 148, 149, 150 and 151 are shown as mounted to wiring panel 148, each receiving a portion of the telephone wires which collectively make bundle 146. A multiple telephone jack slide assembly of the type provided by the present invention is associated with each of the punch down terminal boards. Thus, multiple telephone jack slide assemblies 152, 153, 154 and 155 are also mounted to wiring panel 120 adjacent one of the aforementioned punch down terminal boards. As shown in FIG. 2, bundles of outgoing wires leave the upper end of each of the punch down terminal boards and collectively form bundle 156 for routing to individual telephones at the business, office, apartment complex, etc. being served.

As shown in the enlarged drawing of FIG. 3, the upper surface of telephone jack 30 opens into a cavity 158 adapted to releasably receive a mating telephone cord plug 160. Typically, the number of such mating telephone cord plugs provided is equal to the number of telephone jacks supported upon assembly 155. Each telephone jack, including telephone jack 30, is coupled by color-coded wires to various rows of terminals provided by punch down terminal board 151. Similarly, each of the mating telephone plugs, including plug 160, is coupled by color-coded wires to associated rows of terminals provided by punch down terminal board 151.

It should be clear to those skilled in the art that a particular telephone line can be connected or disconnected simply by inserting or removing plug 160 from jack 30. It will be further appreciated that, by moving plug 160 from socket 30 to a different socket, telephone service for a particular user can be moved to a different office or apartment. Referring briefly to FIGS. 4 and 5, it will be noted that enlarged holes, such as those designated by reference numerals 162 and 164 may be formed in side walls 104 and 106 to facilitate the passage therethrough of the wires secured to each of the telephone plugs.

In some instances, it may be preferred to increase the amount of spacing between successive telephone jacks, for example, to match the spacing of associated terminals on the adjacent punch down terminal board. In such instances a spacing member may be inserted within the channels of the jack support member between successive telephone jacks in order to increase the spacing therebetween. Referring to FIGS. 4, 9 and 10, spacing member 164 is U-shaped and includes an upper wall 166 and opposing front and back walls 168 and 170. As shown in FIG 9, grooves 172 and 174 are formed within back wall 170 immediately below upper wall 166, grooves 172 and 174 permitting back wall 170 to slide between the opposing edge portion 62 and 64 of channel 24. Similar grooves are formed within front wall 168 in order to permit spacing member 164 to be slidingly received within channel 24.

FIGS. 11 and 12 illustrate an alternate embodiment of the present invention wherein the multiple telephone jack slide assembly is configured to provide a jack supporting channel along both sides of a centrally mounted punch down terminal board. Within FIG. 11, the multiple telephone jack slide assembly is desginated generally by reference numeral 180 and includes a generally planar rectangular base 182 having a first side edge 184 and an opposing second side edge 186. A first side wall 188 extends upwardly from side edge 184 of base 182, substantially perpendicular to base 182. A first generally planar elongated surface 190 includes a first side portion 192 coupled to and supported by side wall 188 for supporting elongated surface 190 at a position spaced apart from and generally parallel to base 182. Surface 190 includes a second side 194 opposite first side 192 and generally separated therefrom by an open ended slotted opening 196 forming a longitudinal channel for receiving and supporting a plurality of telephone jacks, such as telephone jack 198. An interconnecting wall 200 extends from the upper end of side portion 194 of elongated surface 190 back toward base 182 and terminates in a flange 202 extending parallel to and overlying base 182. Flange 202 is welded or otherwise fastened to base 182 to aid in supporting elongated surface 190.

Similarly, a second generally planar elongated surface 204 is supported above and along the opposite side of base 182 by a second side wall 206 extending substantially perpendicular from side edge 186 of base 182. Generally planar elongated surface 204 includes a first side 208 adjacent side wall 206 and a second side 210 opposite thereto and generally divided therefrom by a second slotted opening 212. Slotted opening 212 forms a similar longitudinal channel within elongated surface 204 for receiving and supporting a second plurality of telephone jacks, such as telephone jack 214. A short interconnecting wall 216 extends from the upper end of second side 210 back toward base 182 and terminates in a supporting flange 218 fastened to base 182.

As in the previously described embodiments, slotted openings 196 and 212 each provide first and second opposing edge portions for being slidingly received within the grooves of the associated telephone jacks supported thereby. Within FIG. 11, slotted opening 196 is bounded by opposing edge portions 220 and 222 which are engaged, respectively, by grooves 224 and 226 of telephone jack 198.

In order to facilitate wiring interconnections to the first and second pluralities of telephone jacks supported within slotted openings 196 and 212, interconnecting walls 200 and 216 do not extend the entire length of base 182. Accordingly, additional means for supporting second side 194 of elongated surface 190, and for supporting second side 210 of elongated surface 204, is required in order to minimize the deflection of side portions 194 and 210 out of the plane normally containing elongated surfaces 190 and 204. For this purpose, one or more supporting legs, such as those designated by reference numerals 228 and 230, are provided for maintaining side portions 194 and 210 spaced apart from base 182 by the same amount as side portions 192 and 208.

As shown in FIG. 11, leg 230 includes a lowermost apertured tab 232. A series of threaded holes such as that designated by reference numeral 234 are provided along the length of base 182, and screw 236 extends through apertured tab 232 and engages hole 234 in order to secure leg 230 to base 182. Leg 230 includes an upper support tab 238 having at least one aperture 240 formed therein and overlying a corresponding threaded hole 242 formed within second side 210 of elongated surface 204. Screw 244 extends through hole 240 and threadedly engages hole 242 in order to support side portion 210.

Still referring to FIG. 11, upper support tab 238 of leg 230 can advantageously extend completely across slotted opening 212 and thereby serve the additional function of abutting at least one telephone jack supported within slotted opening 212 to inhibit sliding movement of the telephone jacks supported therein. In this manner, leg 230 may serve as a retaining member analogous to retaining member 40 described with reference to FIG. 1. A second hole 246 is formed within upper support tab 238 overlying a corresponding threaded hole 248 formed within first side portion 208 of elongated surface 204. Screw 250 is advanced through hole 246 and threadedly engaged with hole 248 to maintain upper support tab 238 perpendicular to slotted opening 212 and in abutting relationship with a telephone jack. Those skilled in the art will appreciate that legs 228 and 230 are applied only after insertion of the telephone jacks which are to be supported within slotted openings 196 and 212 between legs 228 and 230 and the upper end of elongated surfaces 190 and 204 in order to avoid interference with the insertion thereof.

As mentioned above, telephone jack support member 180 shown in FIGS. 11 and 12 is adapted to support a punch down terminal board upon the central portion thereof intermediate elongated surfaces 190 and 204, and hence, between the pluralities of telephone jacks supported therein. Within FIG. 11, dashed rectangle 252 designates the portion of base 182 covered by such a punch down terminal board. As shown in FIG. 12, terminal board 254 is provided with six wire gripping terminals 256–261 in each row. Terminals 256–258 are shorted to one another and are insulated from terminals 259–261, the latter of which are also shorted together. Terminals 256–258 may be used for wiring interconnections to telephone jacks and associated telephone plugs supported within the channel of elongated surface 190, while terminals 259–261 may be used for wiring interconnections to telephone jacks supported within the slotted opening 212 forming the channel within elongated surface 204.

As shown in FIG. 12, terminal board 254 rests upon base 182 of the jack support member. Terminal board 254 may be of the type commercially available from AT & T under model number 66B3-50, which terminal board has holes formed in the four corners thereof for permitting the terminal board to be screwed or otherwise fastened directly to a telephone interchange wiring panel. One of such holes is shown in dashed outline within FIG. 12 by reference number 262. Corresponding holes, such as those designated 264 and 266 within FIG. 11, are formed within base 182. Accordingly, a single screw or other fastener (not shown) may be simultaneously extended through hole 262 in terminal board 254, and through hole 264 in base 182, and threaded into the wiring panel therebehind in order to simultaneously secure terminal board 254 to base 182 and to secure base 182 to the wiring panel.

Those skilled in the art will appreciate that each of the telephone jack support members described above may be made from relatively thin sheets of steel or aluminum using conventional metal working stamping and bending procedures. Telephone jacks of the type referenced above are commercially available from American Telephone & Telegraph Company (formerly Western Electric) under various model designations, including Model WE 652A and No. WE 652D. Model No. WE 652A is supplied with side grooves approximately 0.1 inch wide, and accordingly, the metal stock in which the jack supporting channels are formed in selected to be approximately 0.1 inch thick. Model No. WE 652D is provided by the manufacturer with side grooves approximately 0.05 inch wide, and accordingly, the thickness of the metal stock from which jack supporting channels are formed to support this type of telephone jack is selected to be approximately 0.05 inch thick.

It will now be appreciated that a multiple telephone jack assembly has been described which conveniently supports a plurality of telephone jacks upon a telephone interchange wiring panel proximate to punch down terminal boards to facilitate wiring interconnections therebetween. While the invention has been described with reference to preferred embodiments thereof, the description is for illustrative purposes only and is not to be construed as limiting the scope of the invention. For example, while the telephone jack support members and related retaining members and stiffening members may advantageously be made of metal, such components may be made of plastic or other materials. Various other modifications and changes may be made by those skilled in the art without departing from the true spirit and scope of the invention as defined by the appended claims.

I claim:

1. A multiple telephone jack slide assembly for supporting a plurality of telephone jacks upon a telephone interchange wiring panel, said assembly including:
   (a) a sliding jack support member having at least one longitudinal channel formed therein and open at one end thereof, said channel being defined by first and second opposing edge portions of said support member, said first and second opposing edge portions being generally directed toward one another and separated by a predetermined distance corresponding to the width of said channel;

(b) fastening means for fastening said support member to said wiring panel;

(c) a plurality of telephone jacks each having an upper surface opening into a cavity for releasably receiving a mating telephone cord plug, each of said telephone jacks further including a pair of opposing side walls extending downwardly from said upper surface and substantially perpendicular thereto, said opposing side walls being separated by a distance approximating the width of said channel, said opposing side walls including engaging means for slidingly engaging said first and second opposing edge portions of said channel for permitting each of said plurality of telephone jacks to be slid into said channel from the open end thereof in order to support said plurality of telephone jacks within said channel; and (d) retaining means releasably fastened to said support member and abutting at least one of said plurality of telephone jacks for inhibiting further sliding movement of said plurality of telephone jacks after the same are slid into said channel.

2. The assembly recited by claim 1 wherein said support member includes a generally planar elongated surface, said channel forming a slotted opening in said generally planar surface, said first and second opposing edge portions comprising the portions of said generally planar elongated surface disposed adjacent the slotted opening therein, said generally planar elongated surface having a predetermined thickness, and wherein said engaging means comprises first and second grooves formed within the opposing side walls, respectively, of each of said telephone jacks, the width of said first and second grooves being commensurate with the thickness of said generally planar elongated surface, the distance separating said opposing side walls being slightly in excess of the width of said channel, said first and second grooves being adapted to slidingly receive said first and second opposing edge portions of said channel, respectively, for supporting each of said telephone jacks in sliding engagement with said support member.

3. The assembly recited by claim 2 wherein said support member includes a pair of lower flanges each extending generally parallel to said generally planar elongated surface, said support member including a pair of side members extending generally upwardly from said pair of lower flanges and coupled to opposing side portions of said generally planar elongated surface for supporting said generally planar elongated surface at a position spaced apart from said pair of lower flanges, said fastening means fastening said pair of lower flanges to said wiring panel.

4. The assembly recited by claim 3 wherein said pair of lower flanges have apertures formed therein, and wherein said fastening means includes threaded fasteners extended through the apertures formed in said pair of lower flanges.

5. The assembly recited by claim 3 wherein said lower flanges have rectangular cutouts formed proximate the end portions thereof for receiving spring biased latch fingers of a terminal board mounting bracket.

6. The assembly recited by claim 1 further including at least one spacing member including engaging means for slidingly engaging said first and second opposing edge portions of said channel for permitting said spacing member to be slid into said channel from the opened end thereof intermediate a pair of said plurality of telephone jacks in order to support said spacing member within said channel between first and second telephone jacks for increasing the spacing therebetween.

7. The assembly recited by claim 1 wherein said support member has at least first and second apertures formed therein adjacent said first and second opposing edge portions, and wherein said retaining means comprises a retaining member having corresponding apertures formed therein and fastening means extending through the corresponding apertures of said retaining member and said support member for fastening said retaining member to said support member across said channel in abutting relationship with at least one of said plurality of telephone jacks.

8. The assembly recited by claim 2 wherein said support member has a second longitudinal channel formed therein by a second slotted opening within said generally planar elongated surface, said second channel extending parallel to said at least one channel, said second channel being open at the end thereof corresponding to the open end of said at least one channel, said generally planar elongated surface including a finger portion dividing said second channel from said at least one channel, the width of said second channel being substantially equal to the width of said at least one channel for slidingly receiving a second plurality of telephone jacks within said second channel.

9. The assembly of claim 8 further including a stiffening member having grooves for slidingly engaging said first and second edge portions of each of said channels in order to stiffen said finger portion against deflection out of the plane of said generally planar elongated surface.

10. The assembly recited by claim 8 wherein said retaining means comprises a retaining member extending generally across both said at least one channel and said second channel and releasably secured to both said finger portion and to opposing side portions of said generally planar elongated surface in abutting relationship with at least one telephone jack in each of said channels, said retaining member serving both to inhibit sliding movement of said first and second pluralities of telephone jacks and to stiffen said finger portion.

11. The assembly recited by claim 10 wherein said retaining member includes a first portion for abutting one of said plurality of telephone jacks in said at least one channel and a second portion for abutting one of said second plurality of telephone jacks in said second channel, said first portion being offset from said second portion for allowing the numbers of telephone jacks supported in said channels to differ from one another.

12. The assembly recited by claim 2 wherein said support member includes a generally planar base having first and second opposing sides extending parallel to said channel, said support member including a first side wall extending from said first side of said base to a first side of said generally planar elongated surface in order to support said generally planar elongated surface at a position spaced apart from said base and generally parallel thereto, said base having apertures formed therein, said fastening means comprising fasteners extending through the apertures formed in said base for securing said base to said wiring panel.

13. The assembly recited by claim 12 including leg means secured to said base and secured to said generally planar elongated surface proximate to a second side thereof opposite said first side in order to stiffen said second side against deflection out of the plane of said generally planar elongated surface.

14. The assembly recited by claim 13 wherein said retaining means comprises a continuation of said leg means extending across said channel and secured to said first side of said generally planar elongated surface.

15. The assembly recited by claim 12 wherein said support member includes a second side wall extending from said second side of said base, said support member including a second generally planar elongated surface having a second slotted opening formed therein to provide a second channel, said second slotted opening dividing said second generally planar elongated surface into first and second sides, said second slotted opening bounded by first and second opposing edge portions of said second generally planar elongated surface, said second side wall being coupled to the first side of said second generally planar elongated surface in order to position said second generally planar elongated surface at a position spaced apart from said base and generally parallel thereto, said assembly including a second plurality of grooved telephone jacks for being slidingly received within and supported by said second channel of said support member.

16. The assembly recited by claim 15 wherein said base is adapted to support a punch down terminal board disposed between said first and second pluralities of telephone jacks supported within said first and second channels, said fasteners used to secure said base to said wiring panel further extending through apertures formed in said punch down terminal board for securing said punch down terminal board to said base directly between said first and second pluralities of telephone jacks supported by said first and second channels.

* * * * *